C. B. FUNK.
LIQUID CLUTCH AND TRANSMISSION.
APPLICATION FILED SEPT. 11, 1917.
1,411,485. Patented Apr. 4, 1922.
4 SHEETS—SHEET 1.
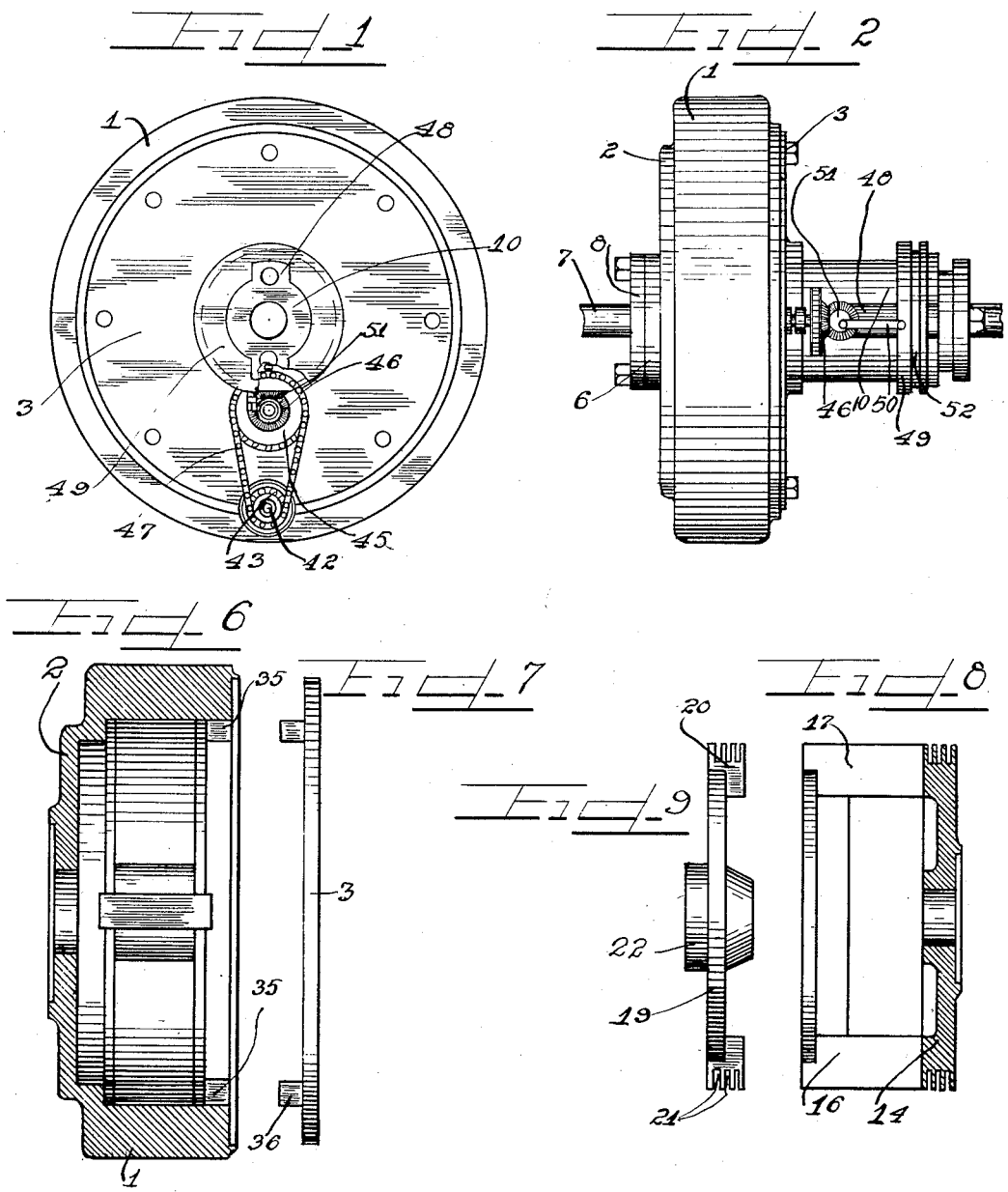
Witnesses
Rudolph J. Berg
Charles Mills Jr.
Inventor
CARLYLE B. FUNK.
By Charles W. Mills Atty.

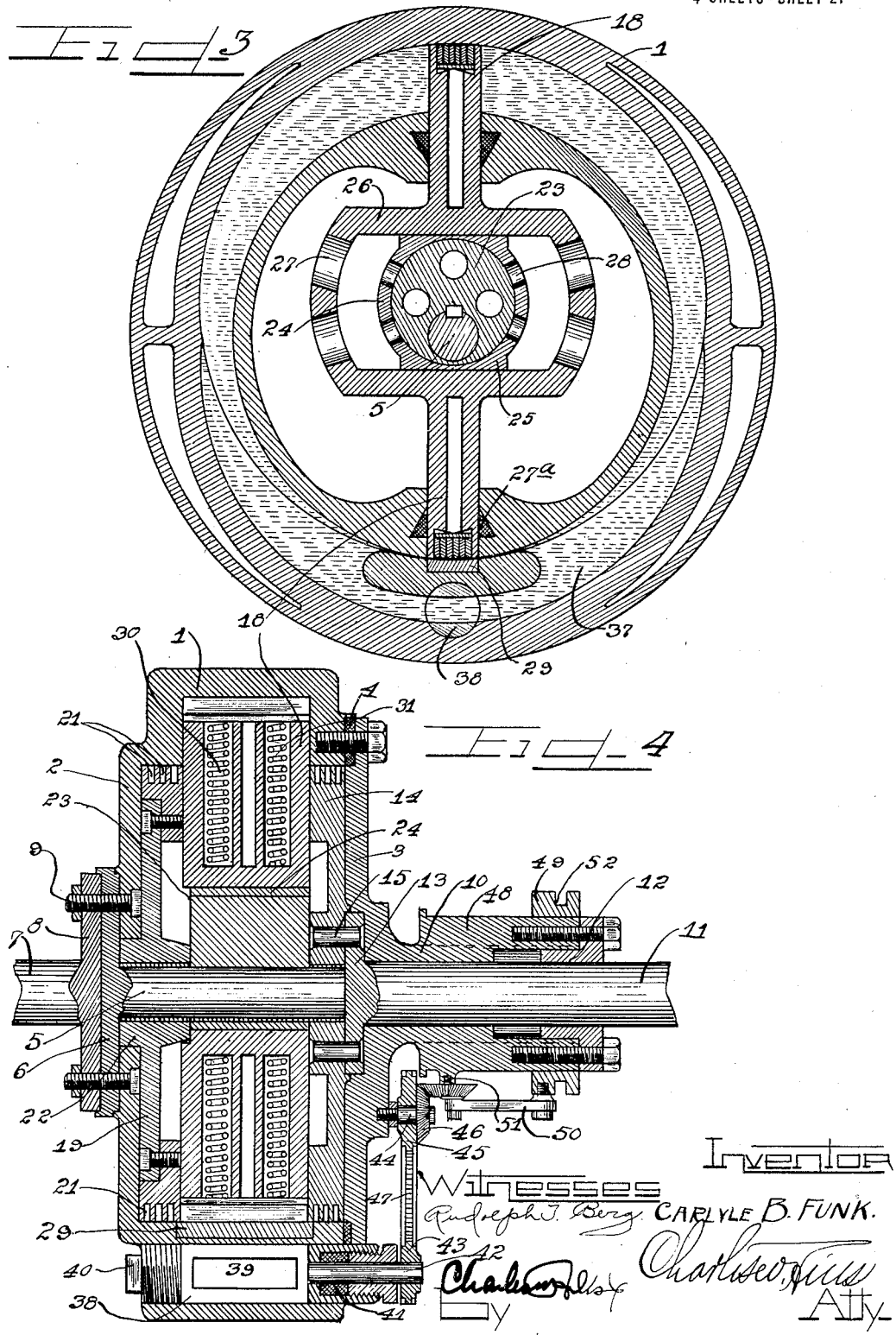

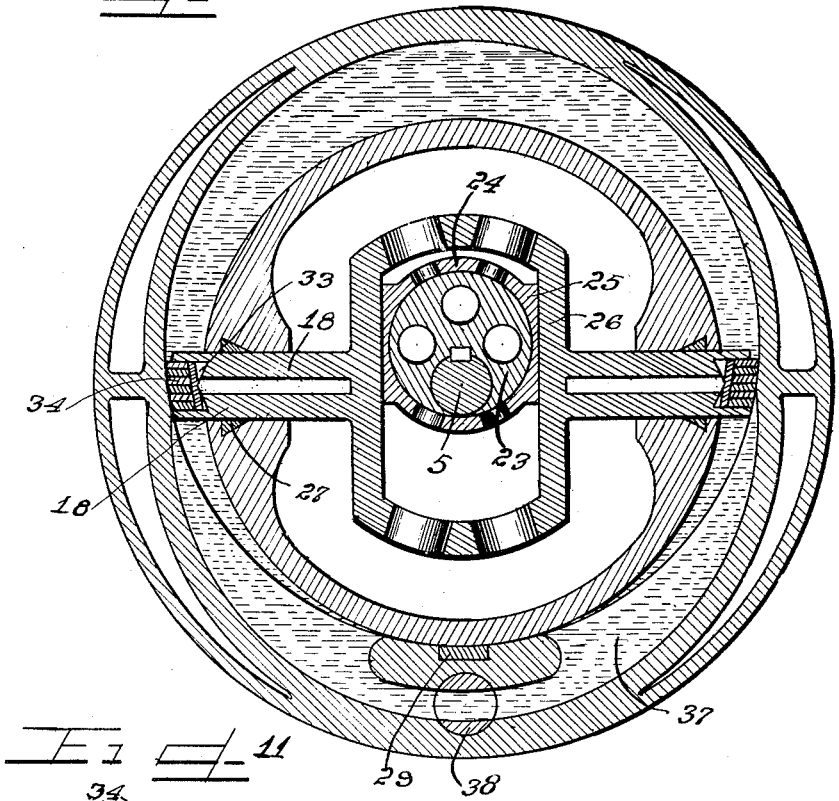
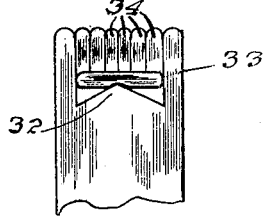
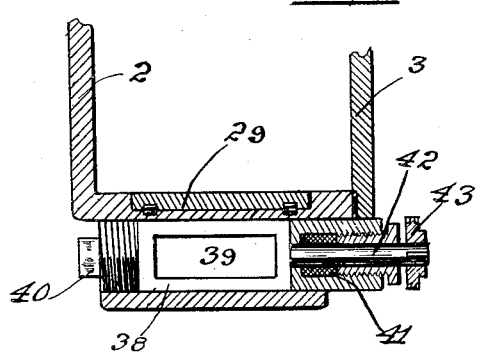
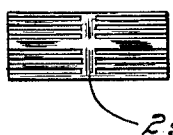

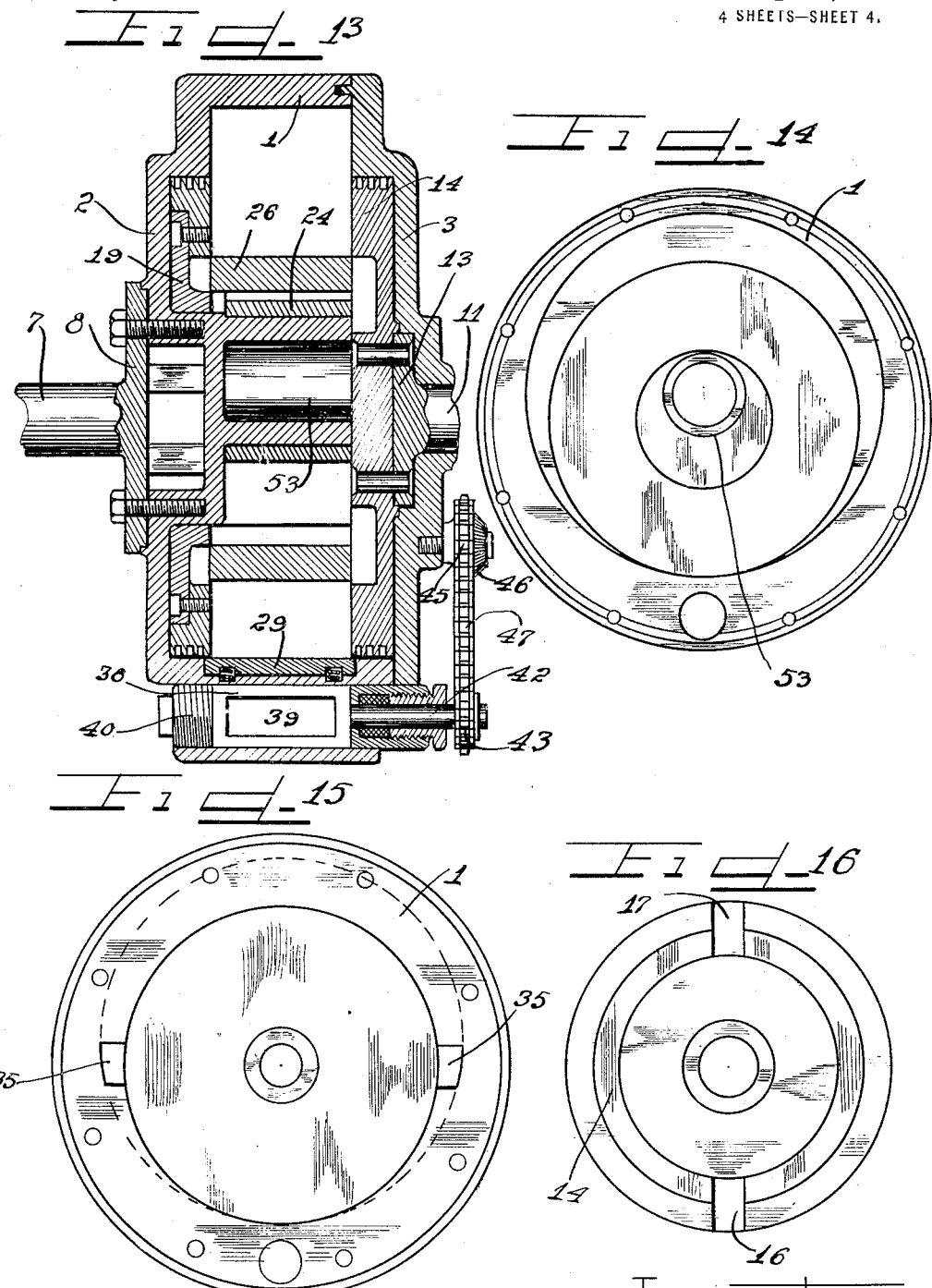

UNITED STATES PATENT OFFICE.

CARLYLE B. FUNK, OF CHICAGO, ILLINOIS.

LIQUID CLUTCH AND TRANSMISSION.

1,411,485.  Specification of Letters Patent.  Patented Apr. 4, 1922.

Application filed September 11, 1917. Serial No. 190,729.

*To all whom it may concern:*

Be it known that I, CARLYLE B. FUNK, a citizen of the United States, and a resident of the city of Chicago, in the county of Cook and State of Illinois, have invented certain new and useful Improvements in a Liquid Clutch and Transmission; and I do hereby declare that the following is a full, clear, and exact description of the same, reference being had to the accompanying drawings, and the numerals of reference marked thereon, which form a part of this specification.

It is an object of this invention to provide a fluid clutch by means of which the drive shaft is connected to drive the driven shaft or to permit free rotation of the drive shaft without actuating the driven shaft and in which a variable speed transmission is provided by control of the liquid in the device.

It is also an object of this invention to provide a liquid clutch and power transmission wherein the non-compressibility of a liquid is utilized as the medium in driving the driven member or shaft from the drive shaft to provide a noiseless clutch and transmission, and one in which the combined effects of an entirely mechanical clutch and a mechanical transmission may be obtained by simply manipulating a valve which in turn controls the action or movement of the body of fluid.

It is also an object of this invention to provide a transmission of the class described for transmitting a drive between a driving and driven member wherein any one of a practically infinite number of speeds may be obtained by manipulation of means controlling the flow of the fluid.

It is further an object of this invention to provide a liquid clutch and transmission in which a single rotor element is provided and in which the variations in speed are effected by controlling the flow of the liquid from one side of the rotor to the other side.

It is further an object of this invention to provide an automatically compensating packing mechanism which is so disposed that its angle of contact with the cylinder wall may constantly vary to provide a contact for the full width of the packing to thereby provide a uniformly tight joint between the vanes and cylinder wall at all times.

It is further an object of this invention to provide a device of the class specified in which the casing forms one part of the driven member and in which a valve controlled passage is provided by opening or closing of which the transmission of the power is controlled.

It is further an object of this invention to provide a simplified device in which a minimum number of parts are employed which is cheap to manufacture and which, in operation, is very efficient and durable.

Other and further important objects of this invention will be apparent from the disclosures in the specification and drawings.

The invention (in a preferred form) is illustrated in the drawings and hereinafter more fully described.

On the drawings:

Figure 1 is a side elevation of a device embodying my invention.

Figure 2 is a view at right angles with Figure 1.

Figure 3 is a vertical central section taken through the clutch and transmission.

Figure 4 is an enlarged vertical section taken through the same at right angles to Figure 3.

Figure 5 is a view similar to Figure 3, showing the abutments or slides in a different position and the operation of the rocking packing mechanism.

Figure 6 is a central section of the cylinder.

Figure 7 is an enlarged view of the cylinder head.

Figure 8 is a sectional view of the rotor.

Figure 9 is an enlarged detail of the head for one side thereof.

Figure 10 is an enlarged detail of the controlling valve.

Figure 11 is an enlarged detail of the rocking packing plate and packing.

Figure 12 is an enlarged detail of the pivot block in the cylinder wall.

Figure 13 is a central vertical section of a modified form of device.

Figure 14 is a view looking into the cylinder with the head plate and rotor removed.

Figure 15 is a view looking into the cylinder shown in Figure 6.

Figure 16 is a side view of the rotor shown in Figure 8.

As shown on the drawings:

1, indicates a casing or cylinder provided with an integral head 2, and a detachable head 3. A packing strip or gasket 4, is provided for forming a fluid tight joint between the detachable head 3, and cylinder 1.

It is, of course, immaterial which of the shafts is the drive or driven shaft, as the device works equally well using either as the drive shaft. However, in the present instance 5, indicates a short shaft provided with a disk coupling head 6, and 7 indicates the drive shaft provided with a coupling disk 8. Said disk coupling heads are rigidly bolted to the cylinder 1, by means of bolts 9, and rotate therewith. The head 3, is provided with a bearing 10, through which the driven shaft 11, extends, and a suitable packing gland 12, is provided to make a fluid tight joint. The driven shaft 11, is provided with a disk coupling head 13, to which is rigidly secured the rotor cylinder 14, by means of rivets or bolts 15. The rotor cylinder is provided with oppositely disposed slots 16 and 17 in which fit the sliding vanes or abutments 18. A detachable head 19, is provided for the rotor cylinder which allows the vanes 18 to be inserted in or attached to the rotor cylinder and the head 19, has oppositely disposed grooved blocks 20, integral therewith, the grooves of which form a continuation of the grooves in the rotor to receive packing rings 21. therein for forming a fluid tight joint. The head 19, has a bearing member 22 which is journalled on shaft 5.

Rigidly secured on shaft 5, and rotatable with the cylinder 1, is a cam member or eccentric 23, cored for lightness and secured on the cam is a sleeve 24, having squared ends 25, which fit in the yoke 26, connecting the abutments or vanes 18. The sleeve 24, and yoke 26, are provided with apertures 28 and 27 respectively for admission of lubrication, making the parts self-lubricating. Suitable packing 27$^a$, is provided on each side of the vanes 18, to provide a fluid tight joint.

The rotor is mounted eccentrically in the cylinder forming a crescent shaped chamber and the rotor contacts the wall at one point at all times. In order that a fluid tight joint may be provided at the point of contact, a block 29, is mounted in the wall of the cylinder 1, and is forced to bear against the wall of the rotor 14 by means of spring members disposed below said block as shown in Figures 10 and 13. Inasmuch as the abutments or vanes 18, rotate about a slightly variable center, the path traced by the outer ends of said abutments is not exactly circular. This is compensated for by means of the novel packing arrangement provided. For this purpose, the vanes 18, are cored longitudinally and seated in the recesses formed are springs 30—31. The vanes are also provided with a recess at their outer ends, and the wall is shaped to provide a bearing or rock seat 32, on which is seated a rocker plate 33, and a plurality of metallic packing strips 34, are fitted in the recess in the outer end of the vanes and seat on said rocker plate, as shown in Figure 11.

Figures 6 and 15, show the cylinder 1, provided with openings 35, through which the vanes are inserted in assembling the device, and the head 3, has lugs 36, to fit in and close said openings. Cored in the wall of the cylinder 1, is a by-pass or passage 37, of substantially the same width as the vanes. The outlet and inlet ports for said passage are slightly below a line drawn through the center of the rotor. Disposed in the passage 37, is a valve 38, positioned opposite the point of contact between the rotor and cylinder wall. Said valve comprises a cylindrical member slotted to provide a passage 39, therethrough. A plug 40, is threaded into the wall of the cylinder and a packing gland 41, is also threaded into the cylinder wall between which the valve 38, rotates. Integral with the valve 38, is a stem 42, on the outer end of which a sprocket wheel 43, is secured. A stud shaft 44, is journalled to the cylinder head 3, and secured thereto is a sprocket wheel 45, and a beveled gear 46. A sprocket chain 47, is trained around the sprocket wheels 43—45.

The bearing hub 10, has ribs 48, integral therewith, on which is slidable a collar 49. Pivoted to said collar is a lever 50, the opposite end of which is pivoted eccentrically to a bevel gear 51, which meshes with bevel gear 46. A suitable yoke (not shown) engages in a groove 52, in said collar whereby shifting of the yoke on the ribs 48, effects the adjustments of the valve 38, through the adjusting mechanism just described.

In the modification shown in Figure 13, the head 3, is the full width of the cylinder 1, which facilitates assembling. Also, the eccentric 53, is cast integral with the cylinder, and the shaft 5, omitted. The drive shaft 7, has its coupling disk 8, bolted directly to the head 2. Outside of these mechanical changes in the detail of construction, the device is practically the same as before described.

The operation is as follows:

In idling or when disconnecting the drive from the driven shaft, the valve is opened as in Figures 3 or 5, in which position the fluid is circulated through the crescent shaped passage 37 and cored passage 39. If the valve was now completely closed, this would prevent circulation or pumping of the fluid, and the fluid being non-compressible, the drive of the rotor from the drive shaft would be imparted through the vanes and fluid to the casing 1, and thence to the driven shaft 11. Any speed between idling and engine shaft speed is obtained by manipulation of the valve 38, which admits a variable quantity of liquid through passage 37, thereby regulating the speed. When used as a clutch alone, it is obvious that by the closing of valve 38, the engine or drive shaft is coupled with the driven shaft and any common type of transmission may be used. The clutch provided by applicant's construction is noiseless, and the device may be used either as a clutch alone or as a combined clutch and transmission.

By use of the pivoted or rocker packing mechanism, the angle of the packing may constantly and automatically change to compensate for the variation in the angle that the vanes or abutments assume, owing to the eccentric mounting, and at the same time the full width of the packing bears against the cylinder wall in all positions. The springs 30—31, constantly exert a pressure on the rocker plate to yieldingly hold the packing against the cylinder wall.

The chamber in the rotor may be filled with grease or oil, and owing to the apertured yoke and sleeve the parts are self lubricating.

Many changes may be made and details of construction may be varied through a wide range without departing from the principles of my invention. I therefore do not desire to limit the patent otherwise than necessitated by the prior art.

I claim as my invention:

1. In a fluid clutch, a cylinder, an eccentrically-positioned rotor member therein, integrally connected abutments or vanes slidable in the rotor, an eccentric disposed in an opening between said abutments and rotatable with the cylinder for operating the abutments, a driven shaft connected to the rotor member, a drive shaft connected to the cylinder, and control means for said rotor member.

2. In a device of the class described, a cylinder, a rotor eccentrically mounted in the bore of the cylinder contacting the cylinder wall at one point, abutments rotatable with the rotor, a yoke integrally connecting said abutments, means in said yoke for sliding the abutments to contact the walls of the cylinder at all times, a passage affording communication between the cylinder on opposite sides of the point of contact between the rotor and cylinder wall, and a valve in said passage below said point of contact.

3. In a device of the class described, a rotatable cylinder, a slotted rotor therein, a cam rotatable with the cylinder, a sleeve rotatable on the cam having opposite sides squared, a yoke on the squared sides of the sleeve, abutments integral with the yoke slidable in the slots in the rotor, and means for controlling the operation of the rotor.

4. In a device of the class described, a rotatable cylinder, a slotted rotor therein, a cam rotatable with the cylinder, a sleeve rotatable on the cam having opposite sides squared, a yoke on the squared sides of the sleeve, abutments integral with the yoke slidable in slots in the rotor, oscillating packing members mounted in the ends of the abutments contacting the cylinder wall at all times, and means governing the operation of said rotor.

5. In a device of the class described, a cylinder, a cam rigidly connected therewith, a rotor provided with oppositely disposed slots, integrally connected oppositely disposed abutments or vanes extending through the slots in the rotor, means surrounding and rotatable by the cam for sliding the abutments relatively of the rotor, and a valve controlled passage communicating with the cylinder on opposite sides of the rotor.

6. In a device of the class described, a casing provided with a cylindrical bore therein, a rotor journalled eccentrically in the bore in the casing contacting one wall thereof forming a crescent shaped chamber in the casing, a by-pass connecting the ends of the crescent shaped chamber, a valve in the by-pass, a chambered yoke in the rotor, a cam in said yoke, and rotatable with said casing, abutments integral with the yoke adapted to be operated by said cam to reciprocate in said rotor, said abutments having recesses in the ends thereof, and rocking packing members mounted in the recesses in the ends of the abutments adapted to vary its angle of contact with the wall of the casing as the angle of the abutments varies.

7. In a fluid clutch, a bored outer casing, a rotor eccentrically journaled in the bore of said casing, a plurality of pumping elements rotatable with the rotor, a chambered yoke connecting said elements, a sleeve slidable in said yoke, means rigidly connected with the casing and engaged in said sleeve for reciprocating said elements, a driven shaft connected with the rotor, means for trapping the fluid to cause said casing and rotor to rotate together or for releasing the fluid to permit differential rotation of the casing and rotor, and a driving shaft connected with the casing.

8. In a fluid clutch, a casing having a cylindrical chamber therein, a slotted rotor member mounted eccentrically therein, vanes slidable in the slots in said rotor, a rock seat formed in each vane, a rock plate mounted on each seat, a plurality of packing strips on said plate all adapted to contact with the cylinder wall regardless of the change in angle of the vanes with respect to the cylinder wall, and controlling means for said rotor.

9. In a device of the class described, a driven rotor, abutments slidable therein, a yoke integrally connecting said abutments, a sleeve slidable in the yoke, a drive casing enclosing said rotor having a chamber in which said abutments operate, an eccentric in said sleeve rotatable with the casing for operating the abutments, a by-pass affording communication between two parts of the cylinder, a cylindrical plug valve in said by-pass for controlling the shifting of fluid from one part of the chamber to the other, and means rotatable with the casing for operating the plug valve.

10. In a device of the class described, a casing having a cylindrical bore therein, a rotor member in the casing, slots in the rotor member, a yoke having vanes slidably mounted in the slots, a cam fixed to the casing, and a sleeve on the cam provided with squared ends for operating the yoke.

11. In a device of the class described, a cylindrically bored casing, a rotor set accentrically therein, contacting one side thereof and forming a crescent-shaped chamber, and a cam-operated single piece vane in the rotor having a yoke-shaped center.

12. In a device of the class described, a cylindrically bored casing, a rotor set eccentrically therein, contacting one side thereof and forming a crescent-shaped chamber, a cam-operated sleeve, and a single piece vane in the rotor having a yoke-shaped center, said yoke-shaped center being provided with two opposite planed surfaces between which the cam operated sleeve is adapted to slide.

13. In a device of the class described, a cylindrically bored casing, a rotor set eccentrically therein, contacting one side thereof and forming a crescent-shaped chamber, and a cam-operated single piece vane in the rotor having a yoke-shaped center, said vane being slightly shorter than the inside diameter of the cylinder.

14. In a device of the class described, a cylindrically bored casing, a rotor set eccentrically therein, contacting one side thereof and forming a crescent-shaped chamber, and a cam-operated single piece vane in the rotor having a yoke-shaped center, said vane being slightly shorter than the inside diameter of the cylinder, and self-adjusting packing strips on the ends of the vane.

15. In a fluid clutch, a cylindrically bored casing, a rotor member set eccentrically therein, a vane slidable in the rotor contacting the cylinder at both ends, the rotor contacting the cylinder at one point, and a spring-actuated block set into a slot in the periphery of the cylinder at said point of contact.

In testimony whereof I have hereunto subscribed my name in the presence of two subscribing witnesses.

CARLYLE B. FUNK.

Witnesses:
 CHARLES W. HILLS, Jr.,
 EARL M. HARDINE.